J. ELY.
HYDROMETER.
APPLICATION FILED AUG. 14, 1907.

964,628.

Patented July 19, 1910.

UNITED STATES PATENT OFFICE.

JAMES ELY, OF SUMMIT, NEW JERSEY, ASSIGNOR, BY MESNE ASSIGNMENTS, TO TAYLOR INSTRUMENT COMPANIES, OF ROCHESTER, NEW YORK, A CORPORATION OF NEW YORK.

HYDROMETER.

964,628.

Specification of Letters Patent. Patented July 19, 1910.

Application filed August 14, 1907. Serial No. 388,483.

*To all whom it may concern:*

Be it known that I, JAMES ELY, of Summit, in the county of Union and State of New Jersey, have invented certain new and useful Improvements in Hydrometers; and I do hereby declare the following to be a full, clear, and exact description of the same, reference being had to the accompanying drawings, forming a part of the specification, and to the reference-numerals marked thereon.

This invention relates to hydrometers and it has for an object to provide an instrument by which the percentage of a solution and the freezing point thereof may be quickly ascertained.

To these and other ends the invention consists in certain improvements and combinations of parts all as will be hereinafter more fully described, the novel features being pointed out in the claim at the end of the specification.

Figure 1:
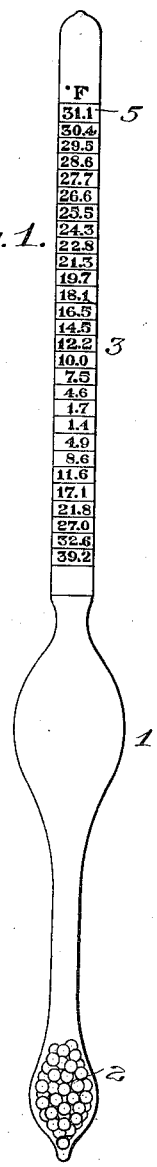
Figure 2:
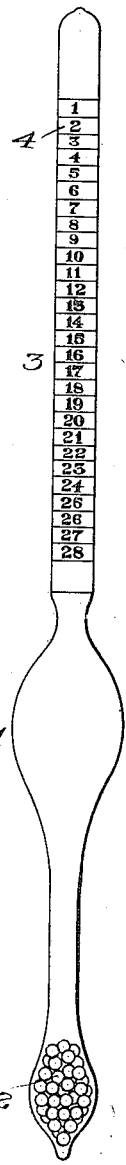
Figure 3:
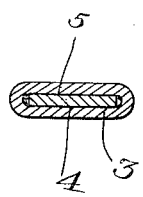

In the drawings: Figure 1 is a view of one side of an instrument constructed in accordance with my invention. Fig. 2 is a view of the opposite side; and Fig. 3 is a horizontal section through the indicating portion.

In measuring the percentage of some solutions such as calcium chlorid it is desirable also to know the freezing point thereof. Of course once having obtained the percentage the freezing point may be ascertained, but this requires time and in addition errors in calculations are likely to occur, and further some people owing to the lack of knowledge along this line, are unable to obtain this information. This instrument makes it possible for any one to maintain in an apparatus as for instance, a refrigerating plant, a working solution which will be economical, and at the same time free from all danger of freezing.

As shown the invention comprises a float 1, a weight 2 arranged beneath the same and an indicating portion 3 projecting upwardly from the float. These parts are preferably made from a piece of glass the float portion of which is hollow and the weight portion containing shot or other material. The indicating portion is preferably in the form of a long narrow and flat hollow body or stem in which is arranged a strip of sheet material containing two correspondingly divided scales 4 and 5, the former having numerals adapted to indicate the percentage of a material at a certain temperature, say calcium chlorid at 60° Fahr. and the latter having numerals adapted to indicate the freezing point of the solution. These scales are preferably arranged on opposite sides of the indicating portion so that there will be no confusion in reading them and as the stem or indicating portion is flat the hydrometer will not rotate.

I claim as my invention.

In a hydrometer, the combination with a float and a weight, of a long narrow flat and hollow indicating portion made of glass and a strip of material arranged within the same and having on one side a scale provided with numerals to indicate the percentage of the material in a solution, and on the opposite side a scale correspondingly divided and provided with numerals to indicate the freezing point of the solution.

JAMES ELY.

Witnesses:
H. H. SIMMS,
HENRY W. HALL.